United States Patent [19]

Pelat et al.

[11] 4,094,387

[45] June 13, 1978

[54] INERTIA DEPENDENT DEVICE FOR PREVENTING AND PERMITTING RELATIVE ROTATION BETWEEN TWO MEMBERS

[75] Inventors: Roger Patrice Pelat, Paris; Gildas Le Pierres, La Ferte Alais, both of France

[73] Assignee: International Vibration Engineering, Boutigny-sur-Essonne, France

[21] Appl. No.: 730,946

[22] Filed: Oct. 8, 1976

[30] Foreign Application Priority Data

| Oct. 8, 1975 | France | 75 30848 |
| Jan. 30, 1976 | France | 76 02561 |
| Jan. 30, 1976 | France | 76 02562 |

[51] Int. Cl.² .............................................. F16F 7/10
[52] U.S. Cl. .................................. 188/1 B; 248/54 R
[58] Field of Search ............... 188/1 B, 1 R, 2 R, 129, 188/189; 248/54 R

[56] References Cited

U.S. PATENT DOCUMENTS

| 2,471,857 | 5/1949 | Bleakney et al. | 188/1 B |
| 3,756,351 | 9/1973 | Sasaki | 188/1 B |
| 3,809,186 | 5/1974 | Suozzo | 188/1 B |
| 3,876,040 | 4/1975 | Yang | 188/1 B |
| 3,983,965 | 10/1976 | Wright | 188/1 B |

*Primary Examiner*—Duane A. Reger
*Attorney, Agent, or Firm*—Brisebois & Kruger

[57] ABSTRACT

Device for inhibiting relative movement between two articles in dependence on the speed of said movement comprises a box connected to one of said articles, a screw connected to the other article and mounted to slide freely in the box, and a nut rotatably mounted on the screw. If the screw is rapidly accelerated, the nut thereon is forced against a friction surface so that it cannot rotate, and this prevents further longitudinal movement of the screw. If, on the other hand, the screw moves slowly, the nut will turn on it, and permit continued movement by the screw.

22 Claims, 13 Drawing Figures

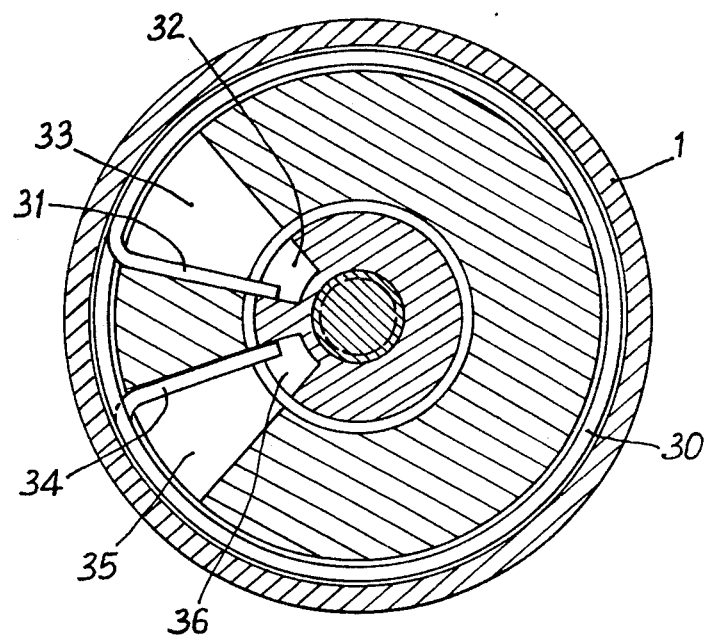
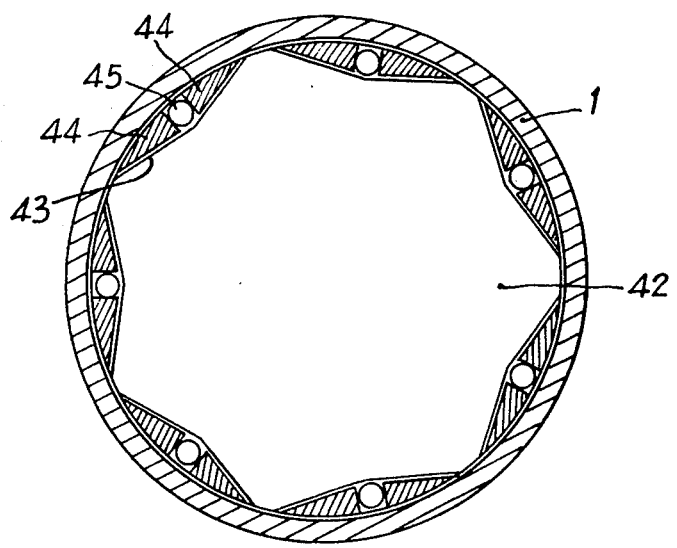

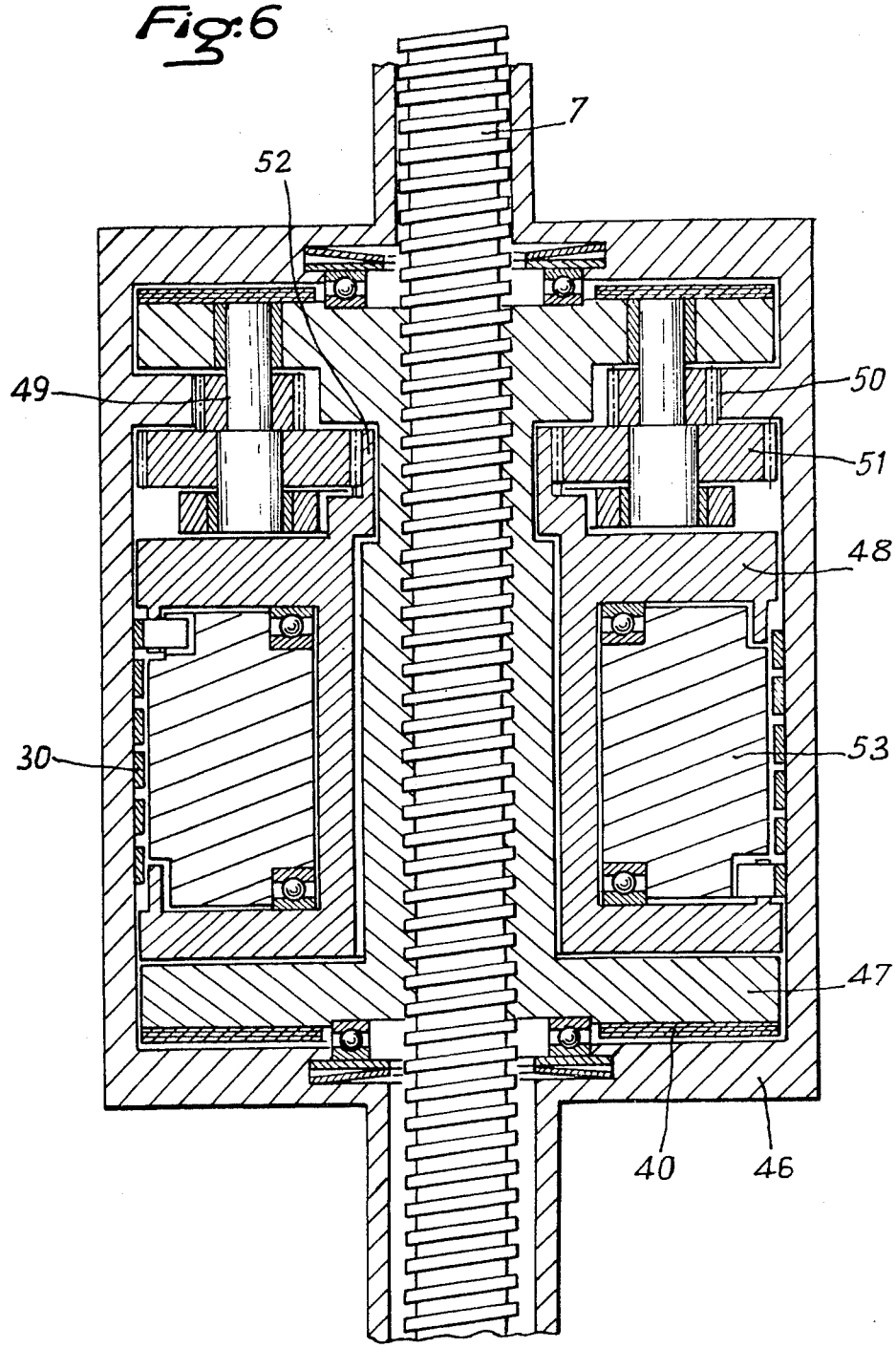
Fig:6

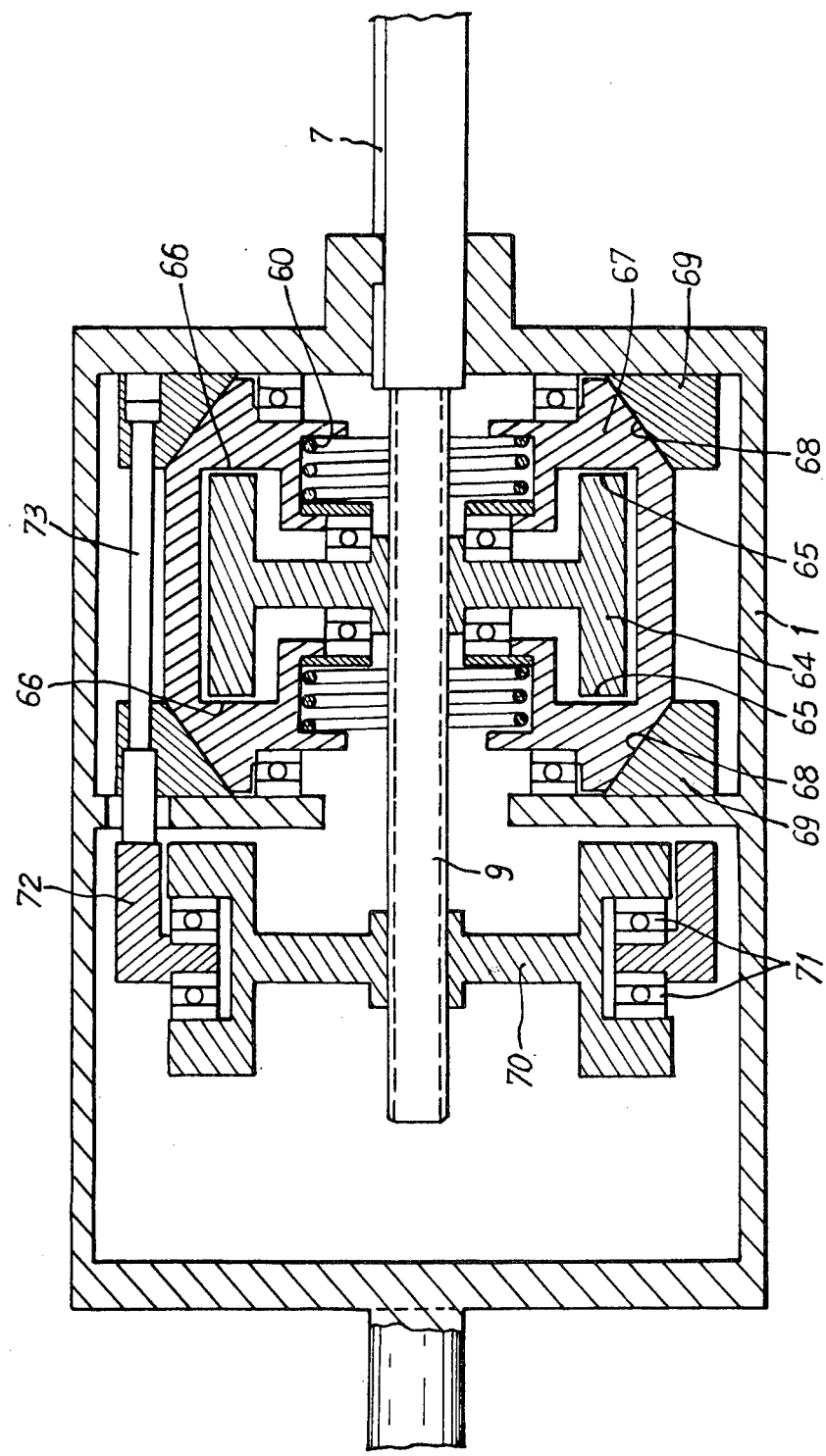

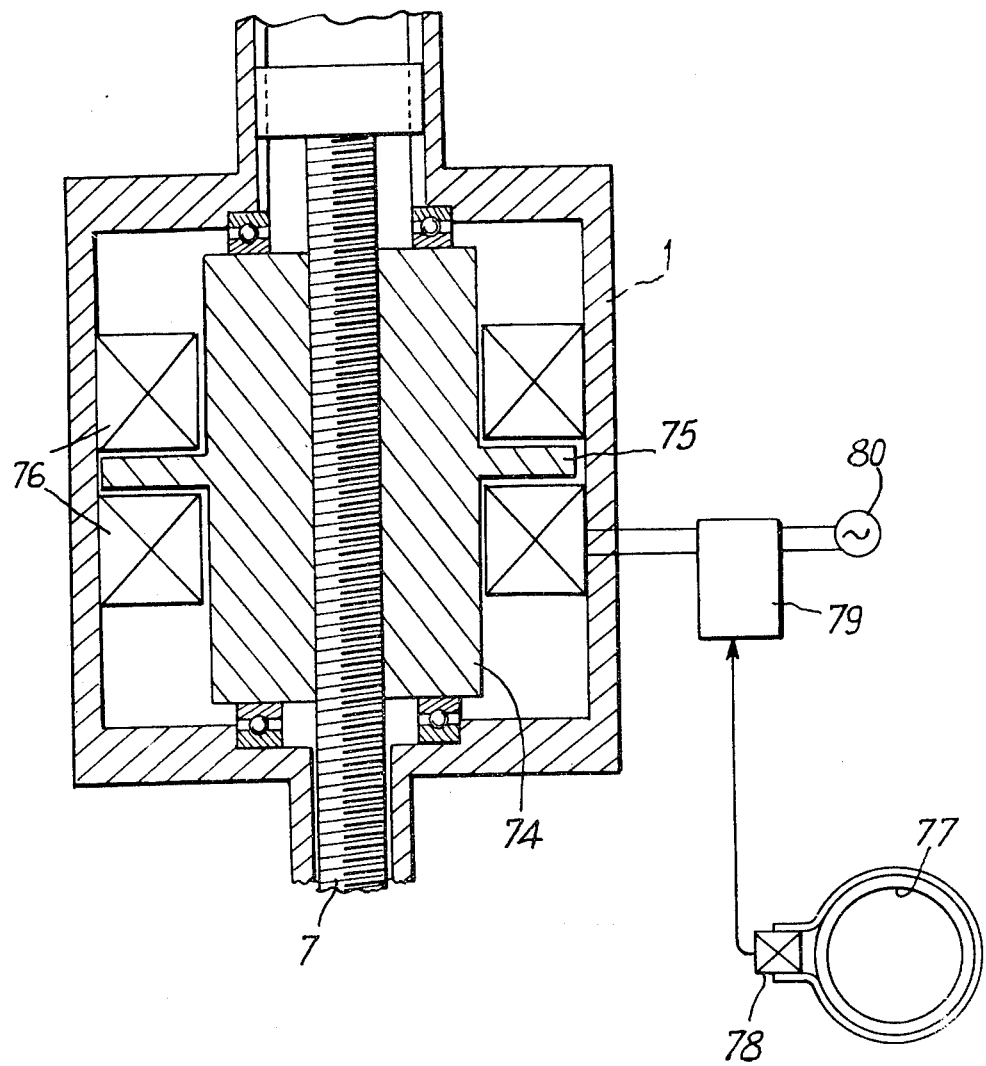
Fig:9

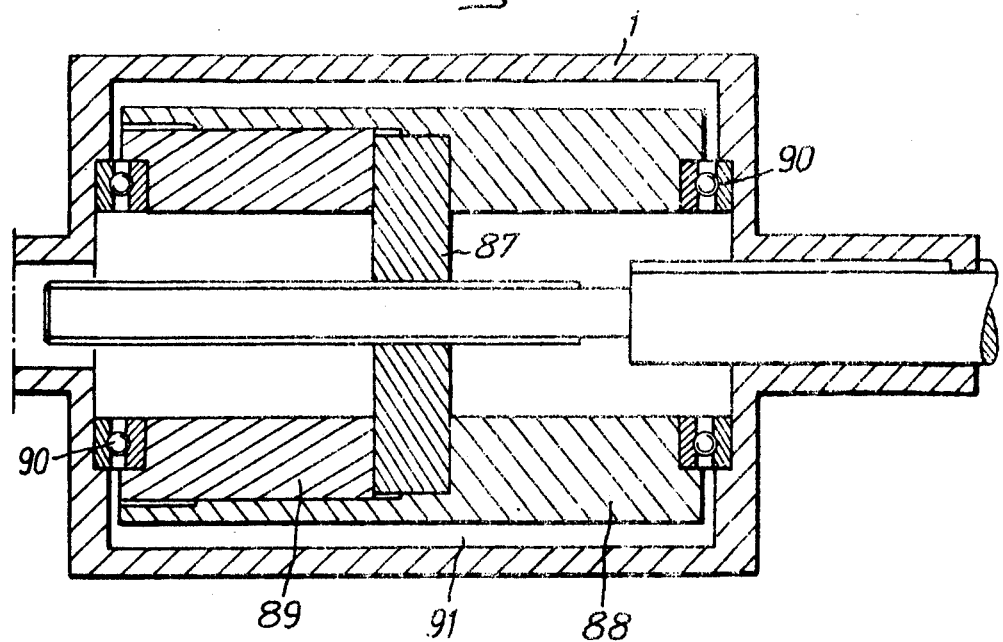
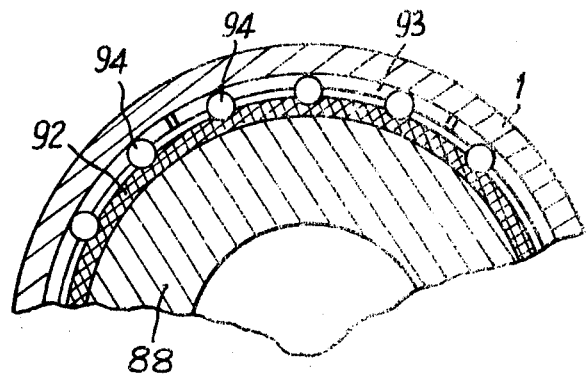
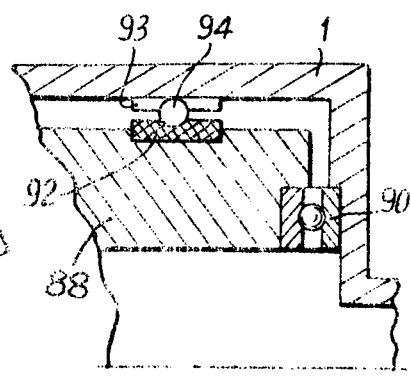

INERTIA DEPENDENT DEVICE FOR PREVENTING AND PERMITTING RELATIVE ROTATION BETWEEN TWO MEMBERS

The present invention relates to a device for preventing disaster, that is to say, a device permitting the displacement of two members one with respect to the other so long as the relative acceleration of this movement remains less than a certain predetermined value and which jams, on the contrary, to prevent that relative movement once that acceleration becomes greater than that value.

Such devices may be usable especially for keeping tubes in nuclear cores so as to permit slow movement of the tube with respect to the structure, for example, under the effect of expansions, but prevent all relative movement in case of substantial acceleration, for example in the case of earthquakes.

Such devices of the hydraulic type are already known and composed principally of a shock absorber the chambers of which are in communication with a reservoir through a valve which closes at a certain pressure, thus preventing relative movement at more than a certain specified speed. These systems have a reliability which is open to criticism over the course of time because of sealing problems and have a certain fragility to temperature because of the materials constituting the seals as well as the hydraulic liquid.

Disaster preventers of a mechanical type are also known which comprise a nut rigidly carried by one of two members and a screw passing through the nut and carried by the other member, the movement of one of the two members toward the other causing rotation of the screw in the nut. A helical spring is wound around a stationary friction surface normally at a certain distance from this stationary surface and one of the ends of this helical spring is attached to a member which rotates with the screw while the other is attached to a loosely mounted inertial mass. In case of rapid displacement, the screw will have a tendency to turn rapidly in the nut and an angular displacement is then rapidly produced between the screw and the inertial mass, which causes an elongation of the spring and a decrease in the diameter of the turns which jam on the friction surface and consequently prevent any further rotary movement of the screw which is then stopped. On the contrary, in the case of slow movement, the rotation of the screw may be transmitted through the spring and only a small angular displacement is produced, which is insufficient to cause stoppage.

Such devices have, however, a certain mumber of disadvantages. In particular, the stopping forces permitted are weak, since they must be assumed by a spring the thickness of which cannot be excessively increased, without increasing the inertial mass beyond acceptable proportins. On the contrary, when the level of acceleration redescends beneath a certain threshhold, the device unjams and in the case of perturbations, a quasi-rigid connection no longer exists between the two members to be held. Moreover, the device is subjected to more rapid wear.

Furthermore, when the value of acceleration expected to produce stoppage of the device occurs, the stoppage is not produced until after a relatively substantial displacement of the rod caused by the play between the spring and the braking surface, which represents a very important disadvantage if quasi-instantaneous stoppage is sought.

One also already knows of a disaster preventer in which the nut screwed on the screw may move toward two stopping surfaces positioned on opposite sides of the nut, the nut being normally maintained in a central position between the abutments by two antagonistic springs bearing on a rotatable ring. This device nevertheless requires a relatively substantial amount of play between the nut and the stopping abutment because of the practical impossibility of maintaining the nut exactly centered between the two strong antagonistic springs. There also, stoppage is not produced until after a by no means negligible movement of the screw. Moreover, this device has a certain complexity and is difficult to adjust. The present invention proposes to provide a disaster preventing device of the mechanical type which does not have the foregoing disadvantages, which is of simple and reliable construction, and which permits a sure stoppage or braking without risk of unexpected release. Moreover, the invention proposes to permit the construction of such devices as a function of a threshhold of acceleration of stoppage which may be situated within a very broad range.

The invention also proposes to provide a device in which the stopping or braking force desired for a shock of a given value is instantaneously attained or quasi-instantaneously attained after a very short path of travel. The invention also proposes to provide such a device in which the stopping or braking force applied is greater when the perturbation is greater, which makes it possible for the device to function for substantial forces limited solely by the mechanical strength of the device itself.

As a variation, the invention proposes to provide a device in which the braking force applied varies as it increases, preferably in a manner proportional to the speed of displacement caused by the perturbation.

The invention has as its object a device for stopping or braking the relative movement between two members as a function of the magnitude of the perturbation causing this movement characterized by the fact that it comprises:

a frame or box connected to one of said members, a component part connected to the other member and capable of sliding through said box without rotating with respect to said box, a rotating member capable of being rotated by movement of the first member to permit this movement and stop or brake said movement when the rotation is stopped or braked when the perturbation has a sufficient amplitude, characterized by the fact that it comprises means for stopping or braking said rotating member after a very short or zero path of travel by the sliding member.

By short path is meant a path, for example, of the order of 0.1 to 0.5 mm. It will thus be understood that once the perturbation has an amplitude, for example due to its speed or its acceleration, such that the actuation of the device must be initiated, the device reacts almost instantaneously without permitting substantial movement of the member with respect to the box. In a first embodiment of the invention the rotating member is maintained normally spaced from abutment surfaces, which surfaces are provided, for example on the box or on another rotating member, by springs or elastic means each of which opposes axial movement of the rotaing member in one direction, said springs being prestressed and positioned so that when the rotating member is displaced against the resistance of one of the springs the other spring exerts no further effect on the rotating member.

In an advantageous manner, the first member may be a threaded rod connected to one of the members while the other member is a rotating nut traversed by said screw and capable of turning inside the box in case of displacement of the rod. The pitch of the threads is of course large enough to permit the transformation of straight line movement into rotary movement.

In this first simplified embodiment of the invention the nut may consist of a single block having sufficient inertia. The two ends rest, preferably through bearing means, against springs, for example disc springs, which themselves bear against the box, said springs being prestressed so that a certain axial force must be transmitted in the direction of the rod to cause displacement of the nut against the springs.

It will be understood that, in such an embodiment, when the rod moves axially with respect to the box with a slow movement, the force transmitted to the nut by the rod is insufficient to overcome the force of the springs in question and the nut begins to turn permitting the displacement of the threaded rod to follow. If, on the contrary, the movement is abrupt, the inertia of the screw prevents rotation of the screw before the force of the springs has been overcome by the axial displacement of the nut driven by the rod. The friction surface of the nut then comes into abutment against the friction surface of the abutment of the box and all further movement in this direction is prevented.

If it is desired, by means of a simplified embodiment of the invention, to cause stoppage for relatively low accelerations, one may then be brought to give the nut a less substantial inertia.

This is why, in a variation of the invention, the nut is associated with an inertial friction device which brakes the rotation of the nut and thereby facilitates the axial driving of the nut by the rod and the stopping. This inertial friction device serves in a way to give the nut a higher apparent inertia. A clutch having an expansible ring may also be used in another embodiment. According to another improvement of the invention one may also associate with the nut an auxiliary nut which rotates therewith but with an amplification of movement, for example, due to small satellite pinions engaged between the nut and the auxiliary nut so as to provoke a more rapid rotation of the auxiliary nut.

This auxiliary nut may advantageously be itself associated with a rotating inertial mass through a helical spring or another clutch as above described. This device permits more rapid axial displacement between the auxiliary nut and the inertial mass which causes more rapid braking of the rotation of the nut and consequently its displacement until it is in frictional contact with the box.

Of course it is clear that the motions of the threaded rod and nut may be inverted, the device comprising for example a non-rotating nut sliding in the box and a threaded rotating rod having a sufficient inertial mass.

In another variation of this first embodiment of the invention the rotating member may be associated with at least one second auxiliary rotating member the inertia of which is preferably greater than that of the first rotating member, means being provided to separate the two members when the movement of the sliding or smooth member has a low acceleration and hold the two rotating members together when this movement has a more substantial acceleration. In this case it will be understood that by suitably selecting the rotating mass it is possible, instead of causing pure and simple stoppage of the rotating member, to cause when the desired threshhold of acceleration is attained, a sort of braking which only permits the continuation of a very slow movement by the sliding member.

In a particular variation, said two rotating members may be connected by means permitting progressive driving, with less and less sliding, of the second rotating member by the first rotating member as the acceleration increases.

In another advantageous variation means may be provided, for example, a brake, to drive the rotary auxiliary member from the first member when a certain threshhold of acceleration has been exceeded.

In this latter embodiment the abutment surfaces may advantageously be provided on the first rotating member capable of cooperating with complementary abutment surfaces on the second rotating member with a sufficient friction to drive the second rotating member, said abutment surfaces being capable of coming into contact after an axial displacement of the first rotating member with respect to the second so as to then permit the first rotating member to drive the second in rotation.

Preferably elastic means are provided between the two rotating members to normally maintain the first rotating member spaced from the abutment surface or surfaces of the second rotating member.

It will be understood that in this case the first rotating member is started in rotation by a small acceleration of the sliding member whereas on the contrary it is driven toward the second rotating member against the resistance of elastic means when the acceleration of straight line movement of the sliding member exceeds a certain threshhold which is a function of its inertia.

In an improved embodiment of the invention means may be provided to brake the nut or the auxiliary rotating member if it exists.

Thus grease may be interposed between the outer surface of this rotating member and the wall of the box so as to inhibit relative movement in case of rotation.

As a variation one may also provide gripping members stationary during rotation, and capable of gripping the rotating member, this gripping being, for example, effectuated by the presence of a supplementary rotating nut screwed onto the threaded rod so as to then provoke gripping of said braking members.

In a second embodiment the rotating member cooperates with braking means or, if preferred, stopping means, controlled by an independent control device capable of immediately detecting a perturbation or a shock. One may provide, for example, a detector of the completely conventional pulse-detector type, responsive to axial displacement of the sliding member, such as a screw, and controlling braking means or stopping means when the speed or the change in acceleration of this movement exceeds a predetermined value. Instead of detecting the movement of the screw the detector may also be positioned in another location, for example, to detect acceleration or the speed at which a member of the tubing is traveling. In another variation the detector may be, for example, a seismograph adpated to deliver a control pulse to braking means when a sufficiently large shock is detected. Any other form of suitable detector may of course be used.

The detector, when the threshhold of detection has been exceeded, is actuated and delivers a control signal, preferably an electrical signal, to braking means or stopping means which brake or stop the nut.

The braking or stopping means preferably take the form of electrical magnetic brakes or couplings. Thus in a first variation of the second embodiment one may provide an auxiliary rotating mass capable of being connected to the nut by a magnetic coupling so as to increase the total inertia of the nut during a perturbation. In another variation the braking means may be an electro-magnetic brake braking or stopping the nut. In a third variation of this second embodiment the braking or stopping means may be controlled by axial translational movement of the nut driven by the rod and in this case one may, as in the first embodiment, position the nut between two prestressed nonantagonistic springs.

In a third embodiment the rotating member capable of being rotated by a movement of the first member and braking said movement when its rotation is inhibited, carries the braking means of said rotating member, said means being responsive to the speed of rotation to increase the braking force when the speed of rotation increases.

In a first variation the braking means may comprise a mass of grease or a material of analogous consistency interposed between the rotating member and the box to create braking of the latter rotating member by a damping effect. In this embodiment said rotating member may advantageously be made in the form of a simple nut having a smooth peripheral surface separated by a short radial distance from the concentric wall of the box, said radial space being filled with grease and sufficiently small for the rotation of the nut to produce damping by the grease which increases rapidly with the speed of rotation.

In another variation of the device according to the invention it may comprise solid damping means such as a strip of an elastomer or like material cooperating with rollers or balls partially seated in the elastomeric mass and rolling in that mass. In such an embodiment the rotating member may advantageously be encircled by a strip of elastomer to which it is attached, said band rotating opposite a succession of balls or rollers carried by the box and partially penetrating the band. Of course the band may also be attached to the box, with the rollers or balls being then carried by the rotating member.

In another variation the braking means may advantageously be actuated by inertial masses responsive to the speed of rotation of the rotating member, the greater or less spacing of said masses being transmitted to the braking means.

In this embodiment means may advantageously be provided for adjusting the masses so that the resultants are insensitive to the action of weight, which action would otherwise be extremely harmful because the devices must be responsive to very low speeds of rotation.

In this third embodiment of the invention one may also, as a variation, locate the nut between two prestressed springs as aforesaid, for example to drive an auxiliary rotating member which is itself braked by grease or by another braking means.

In all the cases one may advantageously provide between the nut and the means which brake it or which stop it a device of any torque limiting type for safety purposes.

Other advantages and characteristics of the invention will appear from a reading of the following description given by way of non-limiting example with reference to the accompanying drawing in which:

FIG. 4 represents a view in transverse section of the device of FIG. 3;

FIG. 5 represents a simplified view of a cam-clutch device which may be used in a device analogous to that of FIG. 3;

FIG. 6 represents a view of a device according to a variation of the invention;

FIG. 8 represents a view in axial section of a device according to a variation of the invention;

FIG. 9 represents a view in schematic axial section of a device according to another embodiment;

FIG. 11 represents a view of an axial section of a device according to a third embodiment of the invention;

FIG. 12 represents a view partially in axial section of a device according to a variation of this third embodiment;

FIG. 13 represents a view partially in transverse section of this variation.

Figure 1:
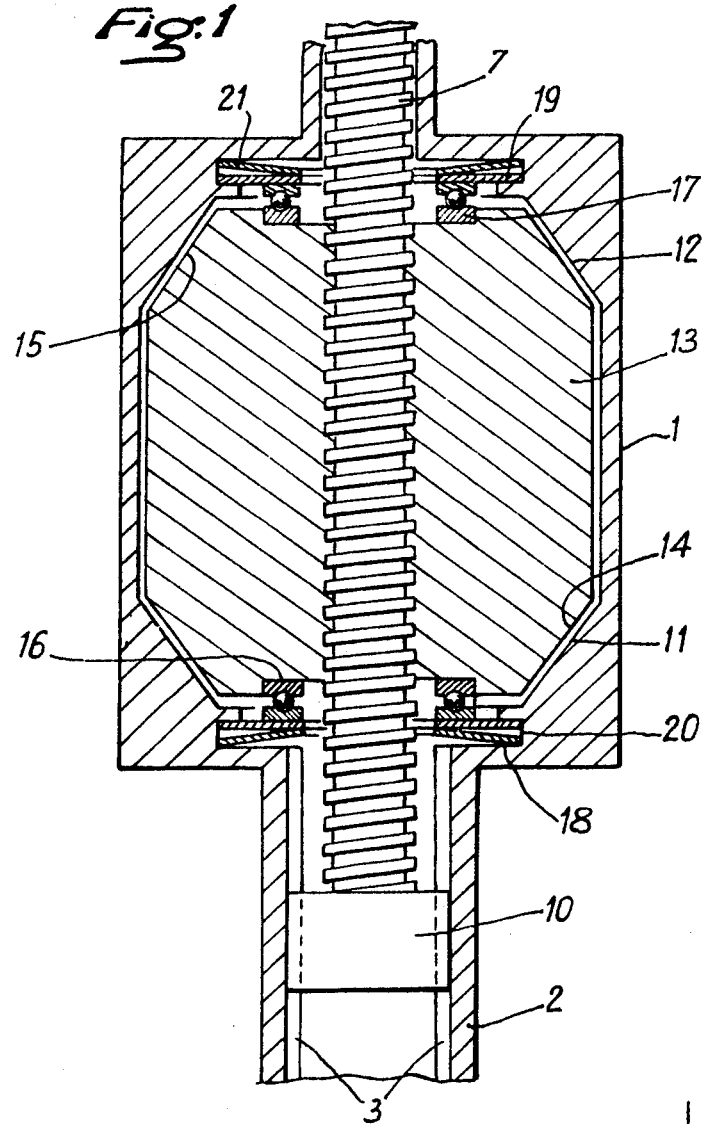
FIG. 1 is an axial sectional view taken through a simplified device according to the invention.
Figure 2:
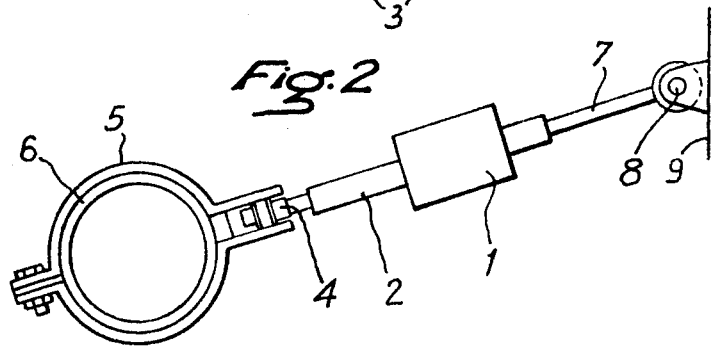
FIG. 2 represents a view of the device mounted for use.

One refers first to FIGS. 1 and 2. The device shown comprises a box 1, for example of cylindrical shape, provided with an extension 2 having inner grooves 3. The extension 2 is connected by a rigid rod 4 to a collar 5 encircling a tube 6, about which it may preferably pivot or rotate. The collar 5 and the box 1 are thus attached to each other.

The box 1 is traversed by a threaded rod 7, one end of which is attached, for example by a pivot 8, to a support 9. The other end of the rod 7 carries a head 10 guided in axial translation in the extension 2 and prevented from rotation by lateral ribs which penetrate the grooves 3. In other words the rod 7 may move axially in the box 1 but cannot rotate with respect to the box. By way of example the duct 6 is a tube of a nuclear reactor and the support 9 is a structural member, for example, the casing of this reactor.

At its inside the box 1 defines a seat which is generally cylindrical in shape around the axis of the rod 7 and its two ends have frusto-conical walls 11, 12. These frusto-conical walls 11 and 12 are destined to serve the role of abutment surfaces of the box. They may be of steel or any other suitable strong material.

Inside this seat is positioned a massive nut 13 screwed onto the threads of the rod 7 by a complementary tapping, and having a generally cylindrical shape with two frusto-conical ends 14, 15 complementary to the frusto-conical surfaces 11, 12. It will be seen that the dimensions of the nut are such that a slight play, for example of the order 0.2 to 0.5 mm, exists between the frusto-conical surfaces 11 and 14 on the one hand and the frusto-conical surfaces 12 and 15 on the other hand. A play also exists between the remainder of the surface of the seat 1 and the outer surface of the nut.

The two end surfaces of the nut 13 bear through ball bearings 16, 17 against two springs 18, 19 seated in the box 1. It will be seen that each spring comprises an elastic steel disc force-fitted into the necks 20, 21 formed by the box so as to be under load, and an abutment disc applied against the bearing. Consequently, in order to overcome the force of a spring, the screw, when it is axially displaced, must be driven with a force greater than the prestress thereof by the two springs which oppose this movement.

The operation of the device is the following:

If the tubing 6 is driven to move with a very slight acceleration with respect to the structure 9, for example, by a movement approaching the structure along the axis of the rod 7, this rod tends to slide downwardly of FIG. 1. Any rotation of the rod 7 is prevented by its sliding head 10. In its sliding movement the rod 7 tends to drive with it the nut 13 against the resistance of the spring 18. However, because of the weak forces corresponding to this slow acceleration, the nut turns by reason of the threads and thus permits the rod 7 to continue to advance. The spring 18 is thus not compressed and the rotation of the nut is not braked. It will be thus understood that the device according to the invention does not resist relative movement at a low rate of acceleration between the tubing 6 and the structure 9. If, on the contrary, the tubing 6 is driven by a movement toward the structure 9 which accelerates more rapidly, for example in the case of an earthquake, the rod 7 is projected downwardly of FIG. 1 with a greater acceleration. By reason of its inertia the nut 13 practically does not turn and is driven axially by the rod 7 against the resistance of the spring 18 which is compressed. In this movement the friction surface of the nut comes up against the corresponding surface 11 of the box and at this moment all movement is prevented, the rotation of the nut being prevented by the frictional effect thus produced and the displacement of the nut being prevented by the abutment between the surfaces 14 and 11.

The nut being immobilized, the threaded rod 7 is also, and the system is stopped. The rod 7 is this not permitted to displace in case of substantial acceleration except in the case of the very slight initial displacement necessary to bring the surface 14 against the surface 11.

By way of example, a device according to the invention has a threaded rod 7 having a diameter of 30 millimeters and a thread angle of 20°. The nut 13 has an external diameter of 200 millimeters and a total weight of 25 kg and an inertia of 0.1 kg/m². The prestressed force of each spring 18 or 19 is 100 kg. Such a device permits the transmission of movement having an acceleration less than 0.02 g but prevents movement when the acceleration is greater. As long as the force applied remains greater than 100 kg the device remains stopped.

It will be understood that this device has other extremely important advantages. By reason of its simplicity it is particularly reliable and robust. The stoppage of the movement is effectuated between the surfaces 11 and 14 of the nut, that is to say, between the box fixed to one of the members and the nut carried by the threaded rod fixed to the other member, the threads being so selected so to permit the transmission of these forces. Moreover, the stopping force is proportional to the force applied.

Figure 3:
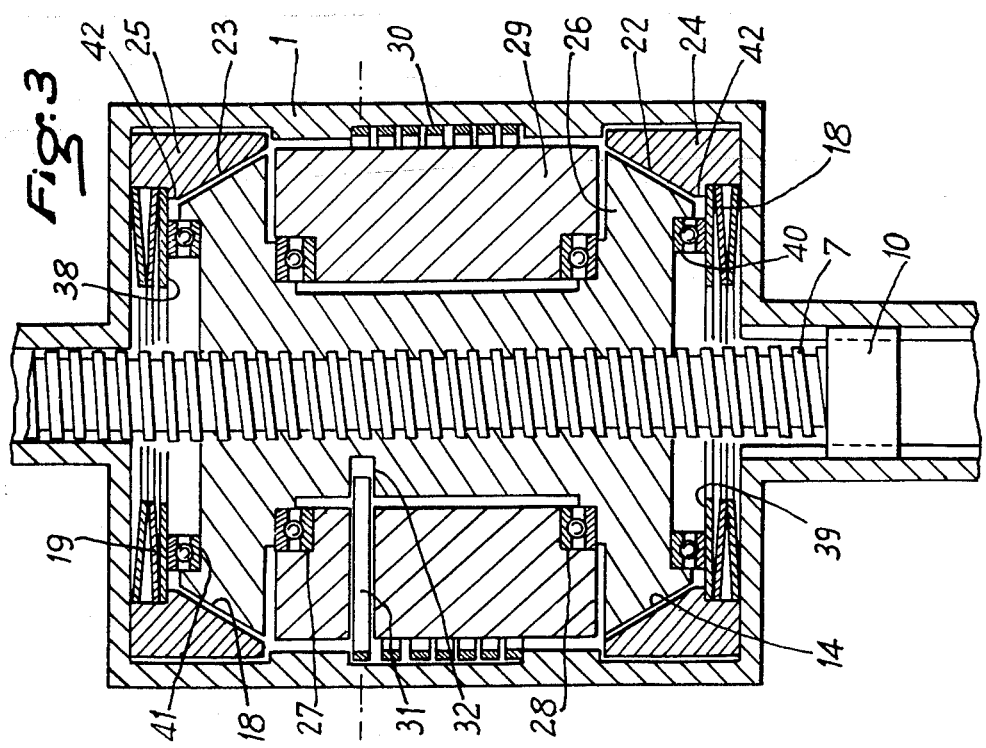
FIG. 3 represents a view of another embodiment of the device.

One now refers to FIG. 3.

In this embodiment one finds the box 1, the threaded rod 7 with its head 10, the springs 18 and 19 with corresponding ball bearings. The frusto-conical abutment surfaces 11, 12 are replaced by similar frusto-conical surfaces 22, 23 formed by the members 24, 25 fixed to the box 1.

One sees, on the contrary, that the nut 26 which still has abutment sufaces 14, 15, has a very large central neck in which a rotatable inertial mass 29 is mounted so as to turn on bearings 27, 28. Moreover a helical spring 30 having a rectangular section has a first end branch 31 which penetrates into a groove 32 having a certain radial opening as may be seen on FIG. 5, cut in the nut 26, said end 31 traversing first a corresponding groove 33 cut in the mass 29. The other end of the spring passes through a groove 34 formed in the inertial mass 29 to reach a groove 36 analogous to the groove 32 in the nut. One sees also that in the rest position the ends 31 and 34 bear on the angularly closest surfaces to one or the other of the holes 32 and 36.

It will be understood that, in these conditions, relative rotation between the nut 26 and the mass 29 necessarily results in a radial expansion of the helical spring 30 which therefore comes into contact with the corresponding internal surface of the box 1. If the rod 7 is displaced at a low acceleration the nut will have time to turn and drive with it the mass 29 through the spring 30 producing only a small angular displacement between the nut and the mass 29. The movement of the rod 7 may thus follow without the screw being led to push back the spring 18 (or 19 depending on the direction of movement). If, on the contrary, a greater acceleration takes place, the nut 26 will this time turn in a more rapid manner but because of the inertia of the mass 29 a greater angular displacement will be produced between the nut and this mass, provoking a greater radial expansion of the spring 30 which then rubs over the internal surface of the box 1 and consequently resists the continued rotation of the nut 26. In these conditions the nut 26 is drawn by the movement of the rod 7 against the spring 18 and the surface 14 of the screw to come into contact with the surface 22 so that all movement is stopped as before.

One now understands that in such an embodiment the real inertia of the assembly comprising the nut 26 and mass 29 may be smaller for a given threshhold of stopping acceleration because the friction of the spring 30 after any first movement of the nut in rotation resists continuation of the rotation of this screw which is then driven by the rod as if it had a greater inertia. However, the spring 30 does not play any part in the resistance to stopping, the resistance to stopping being entirely provided by the frusto-conical surfaces such as 22 and 14 for example.

Of course it would be possible, in a device such as the one illustrated on FIG. 3, to replace the spring 30 by any other means capable of producing friction against the surface of the box 1 in the case of angular displacement between the nut and the inertial mass.

Thus by way of variation FIG. 5 shows means analogous to a cam or wedge clutch. In this embodiment the nut 42 has, over part of its periphery, a plurality of recesses 43 in which are lodged loose wedges 44. Between two wedges 44 located in the same seat 43 is a rod 45 such as seen in section on FIG. 5 and one end of which at least is fixed to an inertia member (not shown) analogous to the member 29.

Thus, in the case of angular displacement between the nut 42 and the inertia member, and consequently between the nut 42 and the different rods 45, one of the wedges 44 of each seat is displaced by the relative movement of the rod 45 and, by reason of the rising slope of the seat 43 this wedge is caused to enter into contact with the inner surface of the box 1 to cause friction resisting rotation of the nut.

Of course any other clutch means may be used such as ring clutches or others.

Of course in this embodiment one also finds the springs 18, 19 bearing in part on the box and in part on the rings 38, 39 capable of being thrust back by the nut 26 acting through the ball bearings 40, 41, the movement of the springs toward the nut being nevertheless limited by the abutments 42.

One now refers to FIG. 6.

In this embodiment the rod 7 passes through a box 46 and cooperates with a nut 47 provided with a friction plate such as 40. Around the nut 47 is rotatably mounted an auxiliary nut 48 capable of being driven in rotation, when the nut 47 turns at an increased speed, through a train of pinions comprising satellite pinions 49 carried by the nut 47, a tooth for the satellite pinions 50 formed by the box 1, an amplifying pinion 51 driven by the shaft of the satellite pinions 49, and gear teeth 52 formed by the auxiliary nut 48. If desired the nut 48 may itself be associated with an inertial mass 53 having a clutch constituted for example by a spring analogous to the spring 30.

Figure 7:
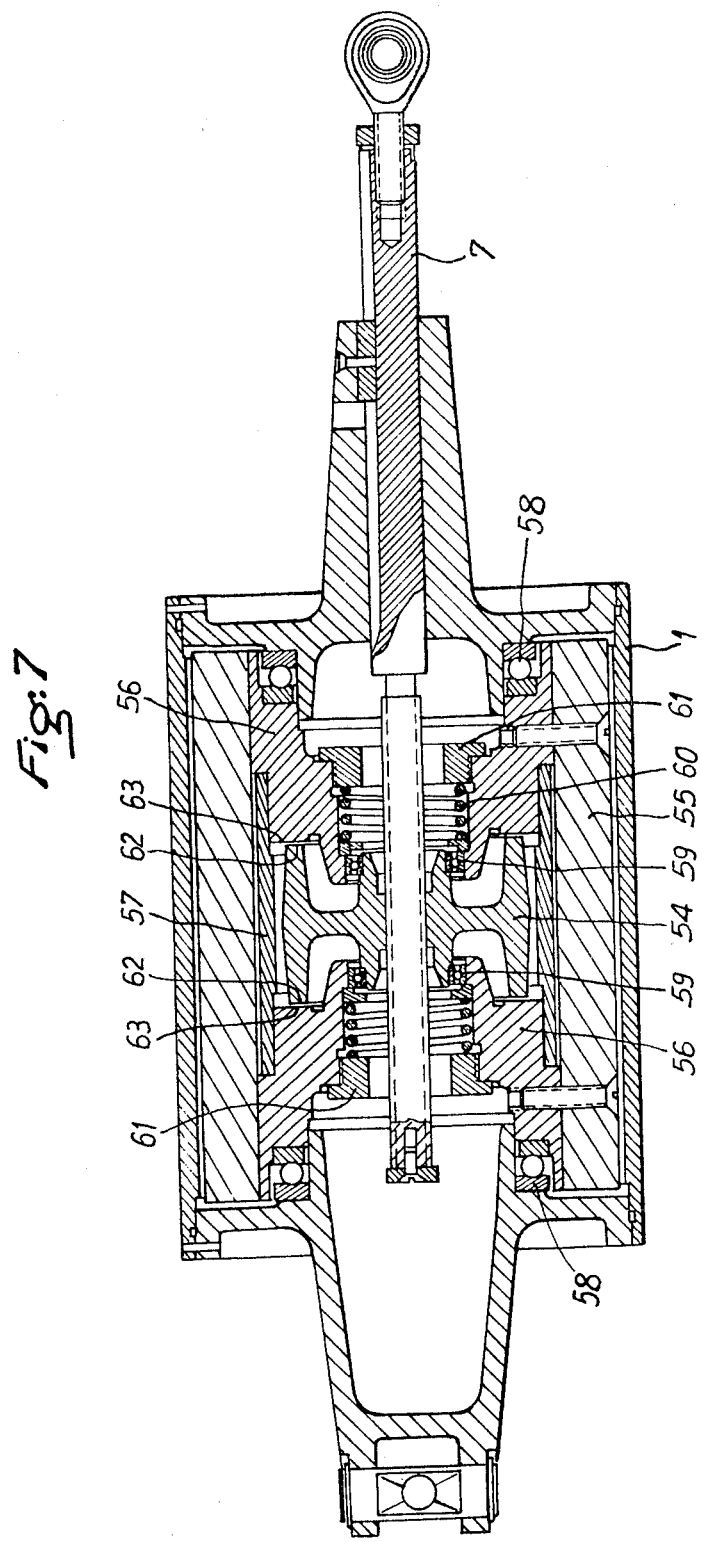
FIG. 7 represents a view in axial section of another device according to the invention.

One refers to FIG. 7.

In this particular embodiment the rotating nut is made in a composite form comprising in fact an auxiliary rotating member. It is seen that the nut 54 is screwed on the threaded part 7 of the rod, the section of which appears on the drawing.

The rotary auxiliary member is constituted by a cylindrical mass 55 capable of turning inside the box 1 and by two annular members 56 fixed to the member 55. A spacer 57 is mounted between the two members 56 which are mounted on the corresponding bearing surfaces of cheek plates by ball bearing means 58.

Moreover, between the nut 54 and the inner ends of the two members 56 are bearings 59 capable of sliding with respect to the members 56 against the resistance of the spring 60 held by the disc 61 fixed to the members 56. In the rest position shown on the figure the springs 60 are already precompressed.

Finally at the periphery of the nut 54 are positioned two radial edges 62 forming abutment surfaces capable of cooperating with the radial surfaces 63 of members 56.

At the rest position a play of about 0.3 mm exists between each abutment 62 and the corresponding abutment surface 63.

It will be understood that, during a translational displacement, at low acceleration the rod 7 with respect to the box 1, the movement of the threads causes the nut 54 to begin to rotate which, for this reason, remains axially stationary in the position shown. However, if the acceleration of the rod 7 exceeds a certain threshhold, the inertia of the nut 54 prevents its rotation and the nut is then drawn in translation by the rod against the resistance of one of the springs 60 and in this movement the corresponding abutment surface 62 comes into contact with the surface 63, the play being eliminated.

Because of the substantial force corresponding to the high acceleration which is imposed on the rod the abutment surfaces 62 and 63 are firmly applied against each other so that the rotating member constituted by the nut 54 is transformed into a rotating assembly of high inertia which resists rotation and thus has a tendency to maintain the rod stationary despite the important force to which it is subjected.

However, because this assembly is rotating, it follows that it may rotate slowly and consequently permit the rod to displace axially at a slow speed despite the substantial force to which it is subjected.

This is, for example, valuable in the case of a tube of a nuclear core subjected to thermal expansion and which, because of jamming at the level of the sliding bearings of the tube, expands in abrupt steps. These steps are braked by the device according to the invention but the expansion is nevertheless permitted to proceed slowly by the rotation of the assembly of the nut 54 and the auxiliary rotating member.

In the embodiment described, when the surfaces of the abutment are applied against each other, the nut and the auxiliary rotating member 11 are fixed to each other almost immediately to form a rotating member having a high inertia. One may, however, provide means for progressively solidarizing the nut with the auxiliary member and in this fashion progressively transform the nut into a rotating assembly the inertia of which increases with the force determined by the value of the acceleration of the movement of the sliding rod.

This may be obtained, for example, by decreasing the radial distance separating the abutment surfaces so as to apply to these abutment surfaces a smaller torque or by providing a treatment for the abutment surfaces to decrease their coefficient of friction.

This may have the advantage of not requiring more than an extremely small play between the nut and the auxiliary mass, the nut sliding against the auxiliary mass when the acceleratiion remains small, but being applied firmly thereagainst to drive it when the acceleration increases.

Moreover, the device formed in this manner has a less abrupt action but one which is nevertheless efficacious in opposing movements of great acceleration. By way of example a device according to the invention may have a thread having a diameter of 12 millimeters and an angle of inclination of the threads of 15°, a nut 54 having a mass of 1 kg and an external diameter of 90 mm, and a rotating auxiliary member having an external diameter of 150 mm and a mass of 24 kg, the force of each spring 60 being of the order of 20 g.

One refers to FIG. 8.

In this embodiment, which is shown schematically, the nut 54 is replaced by a nut 64 provided with abutment surfaces 65 cooperating with an abutment surface 66 on a rotating auxiliary member 67. The springs 66 are still present.

The member 67 has frusto-conical lateral surfaces 68 capable of cooperating with brake rings 69 having a complementary frusto-conical surface. These brake rings may move axially but are prevented from rotating with respect to the box.

A second nut 70 is mounted on said cylinder and has in its periphery a neck into which is introduced with the interposition of bearings 71, the inner part of a ring 72 which is immobilized against rotation but may be axially displaced. The ring 72 has rod 73 cooperating, as may be seen on the figure, with rings 69 so as to hold these rings against the surfaces 68 of the member 67 when the ring 72 is displaced axially to the left or to the right.

The operation is as follows:

For movements of slow acceleration of the rod 7, the nuts 64 and 70 are rotated and the movement continues.

On the contrary, for movements of greater acceleration exceeding a certain threshhold, which is a function of the inertia of the nut 64, the latter is repulsed axially against the resistance of one of the springs 60 and one of the abutment surfaces 65 comes into contact with the corresponding abutment suface 66 so that the nut 65 and the member 67 form only a single rotating assembly.

Moreover the nut 70 is also displaced, either toward the left or toward the right and it drives axially with it the ring 72 and the rods 73 which then causes tightening of the members 69 against the surfaces 68 and member 67 and consequently a friction resisting rotation of the member 67.

One refers to FIG. 9.

In this embodiment a nut 74 is fixed to the rod 7, said nut being capable of turning inside the box 1 in which it is mounted by ball bearings. The nut 74 carries a central radial flange 75 capable of movement between the two jaws of an electromagnetic brake 76. When the rod 7 is translated at a low acceleration the nut 74 may turn easily and the brake 76 is not actuated. If, on the contrary, a perturbation is detected, for example at the level of any member of the tubing 77, for example by means of an accelerometer 78 fixed to said tube and causing the actuation of the jaws of the electromatic brake 76 which brakes the nut by means of the flange 75 and the rotation of the nut is thus slowed or, if desired, stopped. The accelerometer 78 controls for this purpose an electronic control device 79 capable of either supplying or not supplying the brake 76 from any source 80 of current.

Figure 10:
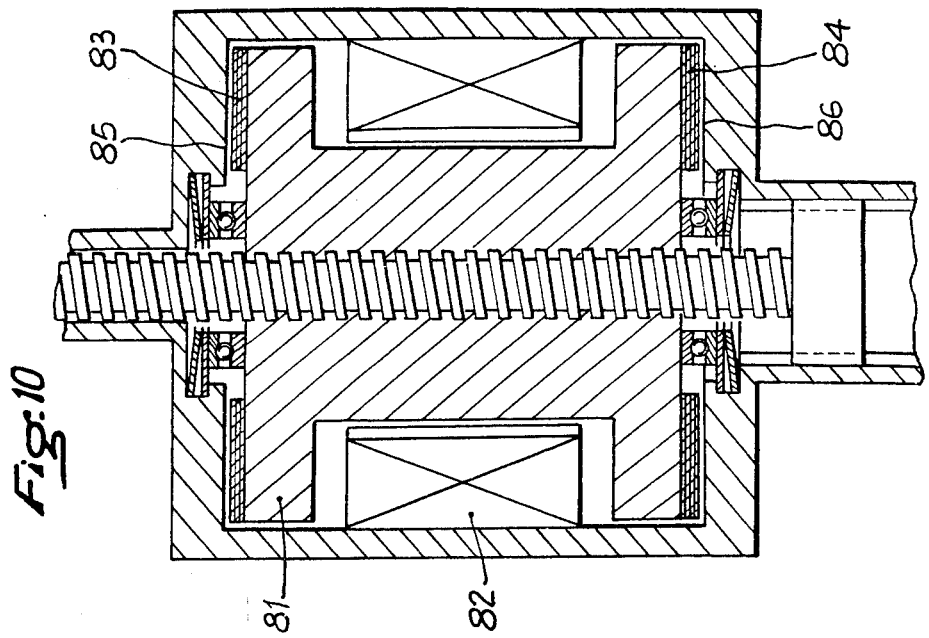
FIG. 10 represents a view of a variation of this other embodiment.

Referring to FIG. 10 one sees a variation of a device analogous in its construction to the device of FIG. 3, but the nut 81 analogous to the nut 26 is associated with an electromagnetic brake schematically represented at 82, also externally controlled, for example by a shock detector or accelerometer. On the other hand, the frusto-conical surfaces 14, 15 of the nut 37 are replaced by flat angular friction surfaces which are for example provided with friction linings 83, 84 designed to rub against each other in the case of axial displacement of the nut against the corresponding plane surfaces 85, 86 of the box. When the threaded rod is driven in a movement having a low acceleration the nut 81 turns without difficulty. If, on the contrary, a greater acceleration is present the shock detector is actuated and controls the electromagnetic brake 82. The rotation of the nut 81 then becomes more difficult and everything proceeds as if the nut suddenly had a much greater inertia so that it no longer turns but is driven by the threaded rod until one of the surfaces 83, 84 comes in contact with the corresponding surfaces 85 or 86, thus completely immobilizing the device.

Of course numerous other variations are possible in which the increase in the inertia of the nut is caused by the external control means, for example by detection by a detector of any type or a seisomograph leading to braking, or as a variation, to complete stoppage.

One refers now to FIG. 11 on which it is seen that, on the rod 7, is mounted a nut 87 provided with interior threads cooperating with the threads of the rod.

The nut 87 carries a substantially cylindrical mass 88 made in fact in two parts 88 and 89 for facility in mounting and turning with the nut in the box 1 while being guided by ball bearings 90. Total mass of the nut and the weight 88, 89 is for example of the order 20 kg. The mass 88, 89 instead of being attached directly to the periphery of the nut 87 may also be connected to that nut through a torque-limiting device to prevent the nut 87 from transmitting too large a torque to the weight and avoid a rupture or deterioration.

Between the external surface of the mass 88 and the concentric inner surface of the box 1 is an annular space 91 filled with grease. Sealing means (not shown) prevent escape of the grease from the space 91 into the space which surrounds the rod 7.

When, in response to an expansion, the rod moves, for example toward the left, screw 87 which is axially immobilized begins to turn slowly provoking only a negligible resistance by the grease in the space 12. If the speed increases the friction in the grease increases and consequently the internal shearing in the grease so that a braking force is exerted on the member 88 and consequently on the nut 87, which slows the translation of the rod.

It will thus be understood that the more the speed increases the greater the resistance by the grease increases and the greater the braking force exerted on the rod. Consequently when, for any reason, for example under the effect of a shock, the speed of translation of the rod tends to increase, the effective braking force exerted prevents it from attaining excessively high values and the duct moves only at slow speed with respect to the structure.

Moreover, if desired, the mass of the nut and the cylindrical member 88, 89 may be such that when the acceleration of movement of the rod becomes too great, the inertia of this mass opposes rotation.

One refers to FIGS. 12 and 13.

In this embodiment the space 91 is no longer filled with grease. On the contrary, the periphery of the member 88 has a neck in which an annular cylindrical elastomeric member 92 is inserted. Opposite the annular member 92 the inner surface of the box 1 supports a stationary ball bearing cage 93 equipped with balls 94 which cannot be displaced with respect to the box 1. These balls penetrate part way into the elastomer 92 which they deform as may be seen on the figures. Consequently, when the member 88 turns, driving in rotation the elastomeric member 92, the surface of the elastomer 92 passes under the balls 94 which penetrate part way into this elastomer and thus produce a damping effect inside the elastomer which is a function of the speed of rotation and degree of penetration of the balls into the elastomer. The elastomer may be replaced by a suitable damping member for example a knit metal wire.

Of course several members 92 with corresponding balls may be provided in the surface of the member 88.

Of course, in an embodiment such as that of FIG. 11, it is also possible to have no grease in the cheek 91 and in this case there is no braking provoked by the grease. It is then necessary to provide a rotating assembly having an inertia sufficient to permit the translation of the rod 7 at low accelerations and prevent this translation at greater accelerations.

In accordance with an improvement of the invention, when the device comprises a nut such as the one shown on FIG. 1 one may advantageously make this nut in two parts, for example, a central part 87 and a peripheral part 88, 89 the two parts being connected, not by a rigid connection, but by means of a torque limiter. Thus the periphery of the central part of the nut may comprise a certain number of radial recesses receiving a small helical spring urging a ball outwardly, while the peripheral part of the nut may comprise corresponding depressions capable of receiving part of each ball. While the torque transmitted between the two parts remains below a certain value the peripheral part is fixed to the central part. However, if the torque transmitted exceeds a value compatible with the strength of the material used, the torque limiter thus formed permits uncoupling of the two parts thus avoiding rupture or deterioration of the device.

It will be understood that one could also use braking means such as grease or equivalent means with very different embodiments comprising prestressed springs. Thus if one refers again to FIG. 7 it will be seen that it would be possible to modify the device of FIG. 7 so as to decrease the thickness of the member 55 and the inertia of the auxiliary nut and introduce between the external surface of such a thinner member 55 and the internal surface of the box 1 a grease which brakes the rotating movement of the member 55 more vigorously as the latter turns more rapidly. One may also conceive of interposing the grease between the nut and the box in a device analogous of that of FIG. 1.

We claim:

1. A device for inhibiting relative movement between two articles, which device comprises:
    a support connected to one of said articles,
    a sliding member connected to the other article and capable of sliding through said support without rotating with respect to said support,
    a rotating member adapted to be rotated by relatively slow movement of the said sliding member to permit said relative movement between said articles, and to resist rotation and thereby inhibit said relative movement in response to more rapid movement of said sliding member,
    two braking surfaces connected to said support,
    said rotating member having two abutment surfaces positioned to be applied against the said braking surfaces upon relative axial movement between said rotating member and said support in one direction or the other,
    said device further comprising two prestressed elastic means for normally maintaining said rotating member spaced from said braking surfaces, and abutment means for preventing each of said elastic means for moving said rotating member, when said rotating member is not urged against said elastic means,
    said rotating member being connected to the sliding membe so as to be started in rotation by a movement of low acceleration of said sliding member, and to be driven longitudinally toward one of said braking surfaces of said support against the resistance of one of said elastic means when said acceleration is greater and sufficient to drive said rotating member with a force greater than the prestress of said elastic means.

2. A device for inhibiting relative movement between two articles, which device comprises:
    a support connected to one of said articles,
    a sliding member connected to the other article and capable of sliding through said support without rotating with respect to said support,
    a rotating member adapted to be rotated by relatively slow movement of the said sliding member to permit said relative movement between said articles and to resist rotation and thereby inhibit said relative movement in response to more rapid movement of said sliding member,
    said rotating member being composite and comprising a first part directly driven in rotation by said sliding member and at last one second part, said device further comprising means for disconnecting said first and second parts when the movement of the said sliding member has a low acceleration, and for fastening said first and second parts together when this movement has a greater acceleration.

3. A device for inhibiting relative movement between two articles, which device comprises:
    a support connected to one of said articles,
    a sliding member connected to the other article and capable of sliding through said support without rotating with respet to said support,
    a rotating member adapted to be rotated by relatively low movement of the said sliding member to permit said relative movement between said articles,
    braking means adapted to resist rotation of said rotating member and thereby inhibit said relative movement,
    at least one shock detector, spaced from said braking means and adapted to control operation of said braking means when a shock is detected.

4. A device according to claim 2 in which said rotating member carries braking means sensitive to the speed of rotation to increase a braking force resisting rotation when the speed of rotation increases.

5. Device as claimed in claim 1 in which each spring is directly applied against a stationary surface of the support.

6. Device as claimed in claim 1 in which said rotating member is a nut and which comprises an inertial mass mounted to rotate loosely on said nut and connected to said nut through a friction clutch capable of frictionally contacting a wall of the support in the case of excessive angular displacement between the nut and said mass to cause braking of the rotation of the nut.

7. Device according to claim 6 characterized by the fact that said clutch comprises a helical spring interposed between the nut and the mass and adapted to expand toward the support in the case of angular displacement between said mass and nut.

8. Device according to claim 6 in which said inertial mass is an auxiliary nut and driven in rotation by the nut through movement amplifying means.

9. Device according to claim 1 in which said rotating member is a nut and which comprises an inertial mass mounted to rotate about said nut, said mass being connected to said nut by friction clutch means interposed between the nut and the inertial mass and adapted to cause, in the case of substantial angular displacement between the nut and the mass, friction against a rotating member, said rotating member having cam surfaces cooperating with abutment members prevented from rotating in the support and capable of coming into contact with said abutment surfaces of the nut in case of rotation of said rotating member.

10. Device according to claim 1 which comprises means for braking the rotation of said rotating member and movement detecting means controlling said braking means.

11. Device according to claim 2 in which the inertia of the second part is greater than that of the first.

12. Device according to claim 11 in which the two rotating parts are connected by means permitting the second part to be progressively driven with less and less slippage from the first part member as the acceleration increases.

13. Device according to claim 2 comprising a clutch for driving the second part from the first when a certain threshhold of acceleration has been exceeded.

14. Device according to claim 13 in which the first part has abutments capable of cooperating with complementary abutments of the second with a friction sufficient to drive said second part, said abutment surfaces being capable of coming into contact after an axial displacement of the first part with respect to the second.

15. Device according to claim 14 in which prestressed springs are interposed between the frist part and the second part to prevent the contact between the abutments from taking place until a predetermined threshold of acceleration has been exceeded.

16. Device according to claim 15 in which the first part is a central nut and the second part is a peripheral mass, said central nut being capable of being axially displaced by the rod while the peripheral member is maintained by the abutments axially immobile in said support, said springs being interposed between the first part and the second part.

17. Device according to claim 2 in which said second part has braking surfaces and comprising braking wedges for cooperation with said braking surfaces, a supplementary rotating member being screwed onto a threaded rod connected to said braking wedges to insure braking of the wedges when it is axially displaced by the rod.

18. Device according to claim 1 comprising braking means acting on said rotating member to increase a braking force when the speed of rotation increases.

19. Device as claimed in claim 18 which comprises a mass of grease or viscous material interposed between said rotating member and said support to create a resistance to rotation of said rotating member which increases with speed.

20. Device according to claim 18 which comprises solid deformable absorbing means cooperating with rolling members partially imbedded in said material and moving with respect to the material.

21. Device according to claim 20 in which solid deformable material is formed in a strip, said strip turning opposite a succession of balls or rollers partially penetrating the strip.

22. Device according to claim 2 comprising, between the first part and the second part of the rotating member, a torque limiting device which prevents relative movement between said parts so long as the torque remains limited to a value beneath a limit value and permitting relative movement between the two parts of said rotating member when this limit value is exceeded.

* * * * *